United States Patent [19]

Sakurada et al.

[11] Patent Number: 4,977,120

[45] Date of Patent: Dec. 11, 1990

[54] BINDERLESS ZEOLITE CATALYSTS, PRODUCTION THEREOF AND CATALYTIC REACTION THEREWITH

[75] Inventors: Satoshi Sakurada; Nobuaki Tagaya; Tadashi Miura; Tsugio Maeshima; Takao Hashimoto, all of Saitama, Japan

[73] Assignee: Toa Nenryo Kogyo K.K., Tokyo, Japan

[21] Appl. No.: 181,124

[22] Filed: Apr. 13, 1988

Related U.S. Application Data

[63] Continuation of Ser. No. 674,910, Apr. 9, 1984, abandoned.

[51] Int. Cl.$^5$ .................. B01J 29/06; C10B 33/28
[52] U.S. Cl. ...................... 502/64; 423/328
[58] Field of Search ............. 502/64, 66, 68, 71; 423/328

[56] References Cited

U.S. PATENT DOCUMENTS

| | | |
|---|---|---|
| 3,119,660 | 1/1964 | Howell et al. ............. 423/118 |
| 3,394,989 | 7/1968 | Drost ........................ 502/68 |
| 3,472,617 | 10/1969 | McDaniel et al. .......... 502/68 |
| 3,966,644 | 6/1976 | Gustafson .................. 502/66 |
| 4,444,738 | 4/1984 | Suzuki et al. .............. 502/69 |

Primary Examiner—Carl F. Dees
Attorney, Agent, or Firm—Sughrue, Mion, Zinn, Macpeak & Seas

[57] ABSTRACT

The binderless zeolite of this invention is comprised more than 90% of crystalline aluminosilicate which is produced by crystalize a binder contained in extrudate obtained by molding a mixture of crystalline aluminosilicate and binder of silica-alumina. This binderless zeolite can improve it's catalytic activity without weaken the strength of the extrudate, since a so-called secondary pores also act as catalyst. Especially, when more than 50% of TSZ zeolite is contained, the catalytic ability of binderless zeolite is so excellent that it is preferably used as the catalyst for selective cracking of n-parafins or alkylation of aromatics using alkylation agents such as alcohols and olefins. Excellent binderless zeolite can be obtained by subjecting extrudate, formed by molding a mixture of about from 30 to 70% by weight of at least one member selected from crystalline aluminosilicate, silica alumina xerogel or hydrothermally treated silica alumina xerogel, and from 70 to 30% by weight of silica alumina gel containing from 2 to 10% by weight of alumina, under hydrothermal conditions.

3 Claims, 11 Drawing Sheets

BINDERLESS ZEOLITE CATALYSTS, PRODUCTION THEREOF AND CATALYTIC REACTION THEREWITH

This is a continuation, of application Ser. No. 06/674,910 filed Nov. 9, 1984, abandoned.

FIELD OF THE INVENTION

This invention relates to binderless zeolites and more particularly, to TSZ crystalline aluminosilicates having controlled secondary pore formed among crystal grains, production processes thereof and processes using the same as catalysts.

BACKGROUND OF THE INVENTION

Crystalline aluminosilicates are generally known as zeolites, and both natural and synthetic products are hydrated aluminosilicates having a crystal structure composed fundamentally of three-dimensional frameworks; one of which is consisting of $SiO_4$ tetrahedra formed by coordinating four oxygen atoms at the apexes of a tetrahedron around the central silicon (Si) atom and the other three-dimensional framework is $AlO_4$ tetrahedra formed by replacing the silicon atom in above $SiO_4$ tetrahedra with an aluminum (Al) atom.

It is known that the $SiO_4$ tetrahedra and the $AlO_4$ tetrahedra constitute basic units consisting of 4-, 5-, 6-, 8-, or 12-membered units formed from 4, 5, 6, 8, or 12 joined tetrahedra or basic units consisting of double rings formed from two such 4-, 5-, 6-, 8-, or 12-membered rings, and that the framework of a crystalline aluminosilicate is determined by interconnection of these basic units.

There are certain cavities in the above framework structure, and their apertures are formed with 6-, 8-, 10- or 12-membered rings. Such cavities have a uniform diameter so that the molecules smaller than a certain size are adsorbed into them while the larger ones can not get into them. Hence, such cristalline aluminosilicates are known as "molecularsieves" according to their functions, and used as adsorbents, catalysts for chemical reactions or catalyst carriers in a wide variety of chemical processes.

In recent years, their applications utilizing a combination of both of the above mentioned functions as a molecular sieve and a catalyst have been energetically studied in a variety of the fields of chemical reactions. These are the so-called molecular shape-selective reaction catalysts and, as shown in the classification made by S. M. Csicsery according to their functions, they are divided into the following three types: (1) catalysts whose active sites can be approached only by special reactions, (2) catalysts in which, among the reactants which have reacted at the active sites, only those having special shapes can leave the reaction sites, and (3) catalysts in which, although individual molecules can freely enter or leave the reaction sites for a bimolecular reaction, they can not react owing to their large transition state ("Zeolite Chemistry and Catalysis" ACS Monograph 171, ACS, Washington D.C., 1976, p. 680).

This classification is made on the basis of only catalytic reactions taking place in the cavities of a crystalline aluminosilicate. Namely, in case of catalytic reactions taking place at active sites on or near the external surface of the crystal, all reactions having low-activation energy can take place—different from the above mentioned catalytic molecular shape selective reactions. Therefore the selectivity of the reactions is lowered.

Accordingly, in order to control the nonselective reactions taking place on or near the external surface of the crystal, there have been proposed a method in which the active sites are buried by coating the crystal surface with a compound and a method in which the solid acidity of the active sites is controlled using some compounds having different solid acidity or alkalinity—such as silicone compounds, phosphorus compounds, magnesium compounds etc.

On the other hand, a method is also known in which the ratio of the number of active sites (the number of active sites in the crystals, having molecular shape selectivity to that of active sites on or near the surface of crystal, having no shape selectivety) is controlled by controlling the crystal size. For example, when the crystal size is increased, the proportion of the active sites in the crystal increases relatively, and the shape selectivity is heightened.

According to this method, however, the access and/or contact of reactants to and/or with active sites are limited relatively which results in lowered overall reaction activity. Conversely, when the crystal size is decreased, the proportion of the active sites on or near the crystal surface increases relatively then the reaction activity is heightened because of a relative increase in the chance for the reactants to approach to or contact with active sites, though the shape selectivity is lowered.

The electrical charge of the aluminum-containing tetrahedron of a crystalline sodium aluminosilicate can be balanced by holding sodium cations within the crystal. It is a well-known theory that these cations can be ion-exchanged by a variety of methods to form a hydrogen-type or a metal-ion exchanged type of crystalline aluminosilicate, which functions as a solid acid catalyst.

In natural crystalline aluminosilicates, the cations are Group I or II metals of the periodic table of the elements, especially sodium, potassium, calcium, magnesium and strontium. Also in synthetic crystalline aluminosilicates, the above metal cations are used, but the use of organic nitrogen cations, for example, quarternary alkylammonium ions such as tetraalkylammonium ions, in addition to these metal cations, has recently been proposed.

For the synthesis of a crystalline aluminosilicate having a high silica/alumina ratio, it has been thought essential to use a nitrogen-containing organic compound as mentioned above as an alkali metal source. The use of the nitrogen-containing organic compounds, however, has disadvantages in that the material cost is high and that the production process is complicated because, in order to employ the obtained synthetic aluminosilicate as a catalyst, it is necessary to remove the nitrogen-containing compounds contained in the product by calcination at high temperatures.

Moreover, in conventional production processes using the above-mentioned tetraalkylammonium compounds or amine compounds such as $C_2$ to $C_{10}$ primary amines, there has been a problem of operation safety because of the latent toxicity of the organic compounds or various dangers accompanying their decomposition or the like encountered in the synthesis, drying and calcination processes.

Furthermore, although it has been proposed to use oxygen containing organic compounds or sulfur containing compounds, these methods can not solve the problems encountered in using the nitrogen-containing organic compounds.

Recently, these problems were partially solved by a invention disclosed in Japan Patent Application No. 143396/1981 (filed Sept. 11, 1981), in which a crystalline aluminosilicate having characteristic crystal structure characterized by an X-ray diffraction pattern had been obtained.

It is a crystalline aluminosilicate having a chemical composition in terms of a molar ratio of oxides of $0.8 \sim 1.5$ $M_2/nO \cdot Al_2O_3 \cdot 10 \sim 100$ $SiO_2 \cdot Z$ $H_2O$, wherein M is a metal cation, n is the valence of the metal, and Z is 0 to 40, and having the powder X-ray diffraction pattern showing at least the interplanar spacings, i.e., d-spacings, shown in Table 1.

TABLE 1

| Interplanar spacings: d (Å) | relative intensity (I/Io) |
| --- | --- |
| 11.2 ± 0.2 | S. |
| 10.1 ± 0.2 | S. |
| 7.5 ± 0.15 | W. |
| 6.03 ± 0.1 | M. |
| 3.86 ± 0.05 | V.S. |
| 3.82 ± 0.05 | S. |
| 3.76 ± 0.05 | S. |
| 3.72 ± 0.05 | S. |
| 3.64 ± 0.05 | S. |

The aluminosilicate having a crystal structure characterized by the above X-ray diffraction pattern was designated as TSZ.

In Table 1, the relative intensities are given in terms of the symbols: V.S.=very strong, S.=strong, M=medium, W.=weak and V.W.=very weak.

From another powder X-ray diffractometric analysis, it was concluded that TSZ belongs crystallographically to the monoclinic system.

On the other hand, when a zeolite catalyst is applied to an industrial process such as a fluidized bed of gas/oil feedstock or a fluidized operation, for example, in catalytic cracking, the zeolite is supplied in the form of fine particles.

It is desirable to increase the surface area of a catalytically active zeolite as much as possible in view of the fact that only the external surfaces of catalyst particles can be utilized almost exclusively because gas-phase reactions are usually conducted at high space velocities, and the diffusion from the catalyst of surface is limited in liquid phase reactions of heavy oil (U.S. Pat. No. 3,966,644 shows that this diffusion limit is about 1/120 in.). Although it can be improved by reducing the diameters of the catalyst particles, the particles are lowered in strength and collapsed. Therefore, the improvement of catalyst performances by this method is limited, and a zeolite catalyst has been applied to industrial processes, after it was molded into pellets by using a suitable binder. When this method is applied, however, the space velocity of the reactants must be lowered because the utilization rate of a zeolite is lowered, which inevitably lowers the productivity, and in addition, a drawback that the zeolite is poisoned as a result of the movement of the alkali, alkaline earth metal or the like contained in the binder into the zeolite arises. Further, since such pellet-form catalysts are prepared by a process consisting of molding, by compression, a zeolite together with an amorphous binder, the amorphous binder penetrated into the so-called secondary pores present among the zeolite crystals, and therefore neither the quantity nor distribution of secondary pores could be controlled though the physical strength is increased.

Further, the above binder has a limitation in that it must be thermally stable and capable of forming paths for passing gases or liquids as the reactants into zeolite crystals.

A honeycomb-like solid crystal prepared by coating a conventional base with a zeolite crystal was proposed as zeolite catalyst excellent in industrial applications (see, for example, British Patent No. 1,441,443, U.S. Pat. Nos. 3,730,910, 3,468,815, 3,244,643, 3,697,446, etc.), but in none of these, the production is easy and the catalytic activities, the physical strengths, catalyst activity maintenance etc., had room to be improved.

According to U.S. Pat. No. 3,119,660, previously formed metakaolin, either alone or in admixture with zeolite A, is reacted with an alkali solution to form 100%-zeolite A, or a soluble silica source is added to the reaction mixture to form zeolite X or zeolite Y which is used as a constituent of pellets or the like.

Further, a catalyst composition is provided which is prepared by burying a zeolite in a porous matrix and which can provide paths into crystal while minimizing a loss due to abrasion during the operation of the active zeolite crystal (Japan Patent Application-OPI No. 133489/1979).

However, in none of above processes, the production is easy and no consideration is made for the so-called secondary pores present among crystals.

The secondary pores are formed, for example, when crystal powder is molded. Therefore, if these pores can be kept effective without decreasing pellet strength (abbreviated as binderless zeolite), the reactants can easily move from one crystal to another, and in addition, the area of the crystal surface having a catalytic activity is increased practically, with a consequent improvement in the catalytic activity of the pellets.

Accordingly, it is a first object of this invention to provide a catalyst containing TSZ zeolite having effective secondary pores and having a special form excellent in catalytic activity.

It is a second object of this invention to provide a binderless TSZ zeolite excellent as a catalyst used in selectively cracking of n-paraffinic hydrocarbons.

It is a third object of this invention to provide a binderless TSZ zeolite excellent as a catalyst for alkylation reaction of aromatics with alkylating agents such as alcohols or olefins.

It is a fourth object of this invention to provide a process for producing a catalyst containing a TSZ zeolite having effective secondary pores and having a special form excellent in catalytic activity.

It is a fifth object of this invention to provide a process for readily producing a binderless TSZ zeolite of special form.

DISCLOSURE OF THE INVENTION

These objects have been achieved by subjecting a solid obtained by molding a mixture prepared by mixing a previously synthesized crystalline aluminosilicate with a silica/alumina binder to a hydrothermal treatment—to crystallize under crystallization conditions.

As the previously synthesized crystalline aluminosilicate used in this invention, both of a TSZ crystalline alumino-silicate and a so-called ZSM-5 can be used. In these crystalline aluminosilicate, one which is not calcined and is still in a state as it is synthesized is included. It is also possible to use a sodium aluminosilicate which is not completely crystallized but partially crystallized and shows an X-ray diffraction pattern close to that of amorphous one, and also possible to use a xerogel which is prepared by subjecting a gel to only a calcination. However, when zeolites other than the TSZ crystalline aluminosilicate are used, it is particularly preferable to use their sodium salt form.

The TSZ crystalline aluminosilicate relating to this invention is characterized by an X-ray diffraction pattern obtained by a standard powder X-ray diffractiometric analysis. Namely, the crystal structure of the TSZ crystalline alumino-silicate differs remarkably from those of heretofore proposed crystalline zeolites in that the diffraction line of $2\theta = 14.7°$ (d = 6.03 Å) is a singlet and that the two diffraction lines of $2\theta = 23°$ (d = 3.86 Å) and $2\theta = 23.3°$ (d = 3.82 Å) are clearly separated from each other. The lattice spacing of this characteristic X-ray diffraction pattern do not vary markedly even when the substituted cation of the synthesized silicate is exchanged, especially, changed into a H form, or $SiO_2/Al_2O_3$ ratio is changed.

The TSZ crystalline aluminosilicate used in this invention which is still in a state as it is synthesized has a preferable composition, in terms of a molar ratio of oxides, of $0.8 \sim 1.5 Na_2O \cdot Al_2O_3 \cdot 25 \sim 80 SiO_2 \cdot O \sim 40 H_2O$, and it is possible in this case to replace at least part of the metallic cations (which are present when TSZ is synthesized) by ion exchange or a like treatment. This ion exchange can be carried out by using a Group II to VIII metal of the periodic table of the elements, hydrogen ion from acids, or ammonium ions. As far as the $SiO_2/Al_2O_3$ ratio falls within the range of 25 to 80, the crystal structure does not change and the hydrogen-form of TSZ is also monoclinic.

The crystalline aluminosilicate which is able to use in this invention can be produced generally by preparing an aqueous reaction mixture consisting essentially of inorganic reaction materials, prepared by using $SiO_2$ as a silicon source and $Al_2O_3$ as an aluminum source in a ratio within a certain range and adding a suitable alkali source and water in a ratio within a definite range, then heating and holding the aqueous reaction mixture at a crystallization temperature until crystals are formed. Such production conditions can be realized, for example, by maintaining at an autogenous pressure and a temperature of about 120° C. to about 230° C. for about 10 hours to 10 days.

The TSZ crystalline aluminosilicate is produced from an aqueous reaction mixture consisting substantially of inorganic reaction materials comprising a silica source, an alumina source, an alkali source, water and a neutral salt of an alkali metal, and the composition of said aqueous reaction mixture in terms of a molar ratio of oxides is as follows:

| | | | |
|---|---|---|---|
| $SiO_2/Al_2O_3$: | 10 | ~ | 130 |
| $Na_2O/SiO_2$: | 0.01 | ~ | 0.5 |
| $(Na_2O + M_{2/n}O)/SiO_2$: | 0.03 | ~ | 0.3 |
| $H_2O/(Na_2O + M_{2/n}O)$: | 150 | ~ | 800 |
| $X^-/SiO_2$: | 0.01 | ~ | 20 | wherein M is a Group I or II metal cation of the periodic table of the elements, and preferably selected from the group consisting of lithium, sodium, barium, calcium and strontium, and n is the valence of the metal.

The $M_{2/n}O$ and the $Na_2O$ are both in a free state and generally take the form of hydroxides, or extremely weak acid salts which are effective in the synthesis of zeolites, for example, aluminates, silicates, etc. Further, the free $Na_2O$ can be controlled by the addition of sulfuric acid, hydrochloric acid, nitric acid or the like.

In this invention it is possible to crystallize a silica/alumina binder which is amorphous in its initial state by molding a mixture prepared by mixing the above produced TSZ crystalline aluminosilicate or the like with the silica/alumina binder into pellets, and then subjecting the pellets to the same hydrothermal treatment as in the production of the TSZ crystalline aluminosilicate, whereby the binderless zeolite of this invention can be obtained.

Since the silica/alumina binder used in this invention crystallizes by the hydrothermal treatment, its composition is preferably one that allows the ready crystallization, and particularly when the binder, having the $SiO_2/Al_2O_3$ ratio nearly equal to that of the TSZ crystalline alumino-silicate, is used with the TSZ crystalline aluminosilicate, a binderless zeolite having a particularly good catalyst performance can be obtained.

Although the shape of the solid used in the hydrothermal treatment is not particularly limited in this invention, it is preferably pellet, polylobal body or hollow tube on account of the easiness of molding or the utilization efficiency in using it as a catalyst, and with respect to its size, outside diameters of about 1.5 mm are preferred from the easiness of handling.

The hydrothermal reaction in this invention can be carried out according to the method disclosed in Japan Patent Application No. 143396/1981 and, when a crystalline aluminosilicate other than the TSZ crystalline aluminosilicate is used as the crystalline aluminosilicate, it is preferable to use a mineralizer or a cation source, and it is particularly preferable to use NaCl as such an agent.

Further, when a so-called xerogel, which is prepared by subjecting a gel simply to a calcination, is used, it is necessary to use more severe conditions than those when a crystalline aluminosilicate is used.

When the hydrothermal treatment in this invention is carried out, the binder crystallizes and shows the X-ray diffraction pattern of TSZ crystalline aluminosilicate, which has the characteristics obtained when the synthesis is carried out without using organic cations, and the distribution of secondary pores is extremely sharp. Although the method of measuring the radii of secondary pores which are controlled in this invention is not necessary established, it is possible to estimate their average radius by the so-called mercury porosimetry. In this invention, the average pore radius is defined as a radius at which the accumulated pore volume which corresponds to ½ of the total pore volume measured by the mercury porosimetry, and the size of this pore radius is important from the viewpoint of catalytic activity because it concerns not only with the actual surface area of the catalyst but also affects the diffusion velocities of the reactant molecules and those of the formed molecules.

The binderless zeolite obtained in this invention has excellent crystallinity as a whole. For example, when a TSZ crystalline aluminosilicate is used as a starting zeolite, it is possible to obtain a zeolite structure which is so uniform that it is almost impossible to discriminate microscopically the TSZ crystalline aluminosilicate formed by crystallization of the binder from that used as the starting material.

DESCRIPTION OF THE MOST PREFERRED EMBODIMENTS

The following examples are provided to illustrate present invention, but are not to be construed as limiting present invention in any way.

EXAMPLE 1

An aluminum sulfate solution was prepared by dissolving 4 g of aluminum sulfate in 170 g of pure water and further adding 5.7 g of concentrated sulfuric acid (95% by weight) and 18 g of sodium chloride. The obtained solution was mixed under agitation with a mixture of 25 g of water and 63 g of water glass (JIS No. 3 water glass, $Na_2O$ content of 9.5% by weight and $SiO_2$ content of 28.6% by weight) to obtain an aqueous reaction mixture having a composition, in terms of a molar ratio of oxides, of

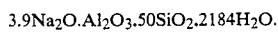

$3.9Na_2O.Al_2O_3.50SiO_2.2184H_2O.$

In this case, sodium chloride as a mineralizer was used in a molar ratio of $Cl^-$ to $SiO_2$ of 1.02. The aqueous reaction mixture was placed in a SUS autoclave, heated and maintained at 180° C. for 20 hours under an autogenous pressure. The crystallized solid product was separated by filtration, washed with water and dried at 110° C. 50 g of the TSZ zeolite powder thus obtained was blended in a kneader with 380 g of a silica alumina wet gel (water content of 86.8% by weight) while the blend was being dried to a moldable water content, and molded into pellets (outside diameter of about 1.5 mm) through an extruder.

The silica alumina wet gel herein used was prepared by adding both of an aqueous aluminum sulfate solution containing 38.6 g of aluminum sulfate, 32 g of 95% sulfuric acid and 330 g of pure water and an aqueous solution containing 476.2 g of water glass (JIS No. 3, hereinafter abbreviated simply as No. 3) and 240.4 g of pure water to 943 g of pure water and then filtering the combined solutions.

The pellets were dried at about 110° C. for 5 hours. Chemical analysis on a portion of these pellets revealed that it had a composition of 78.9% by weight of $SiO_2$, 4.48% by weight of $Al_2O_3$, 4.18% by weight of $Na_2O$, and 12.4% by weight of an ignition loss (900° C.).

The pellets were further calcined at 600° C. for about 3 hours. A 50 g portion of these pellets together with 43.2 g of sodium chloride and 619 g of pure water was placed in a all stainless autoclave and crystallized at 180° C. for 40 hours.

Figure 1:
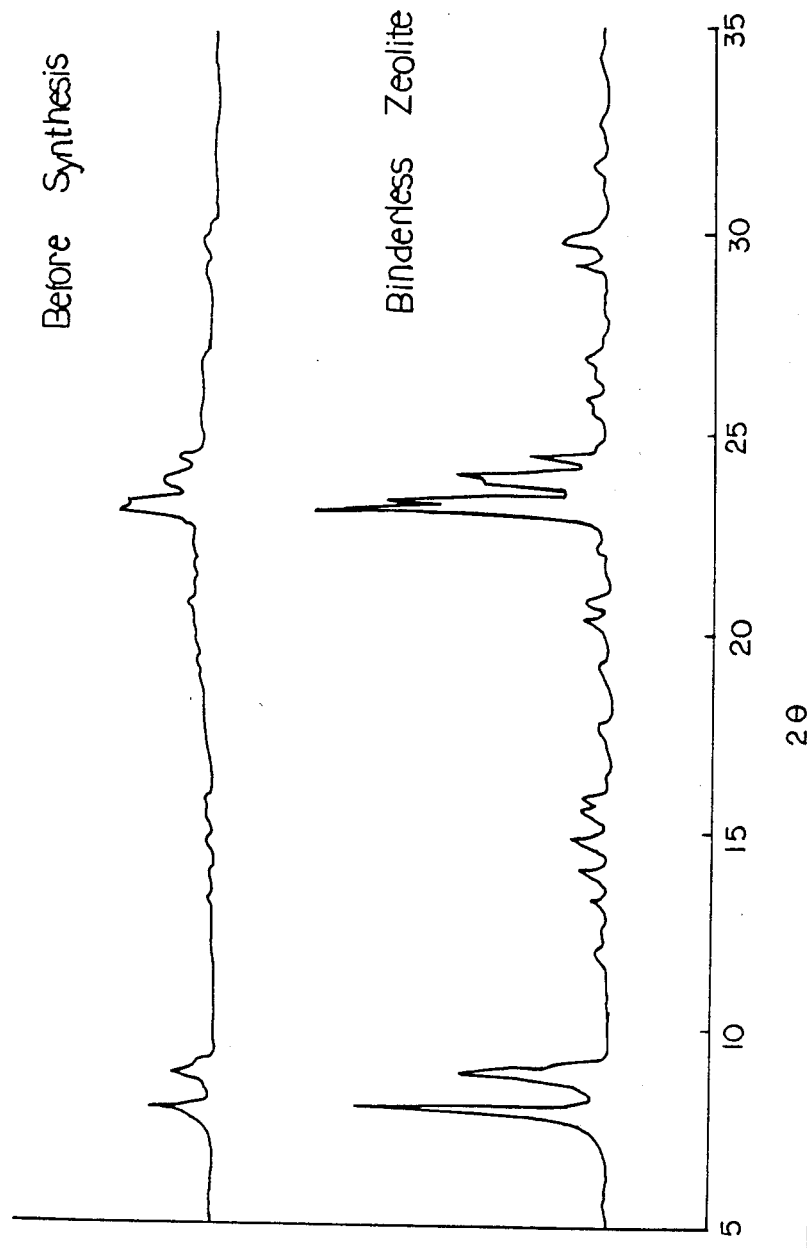
FIG. 1 shows the powder X-ray diffraction patterns of pellets before and after the synthesis to form the binderless zeolite in Example 1.

After lowering the temperature, the pellets were withdrawn from the autoclave, washed, dried, and subjected to a powder X-ray diffractometric analysis to obtain the diffraction pattern of TSZ. FIG. 1 shows the powder X-ray diffraction patterns before and after the synthesis.

Figure 4A:
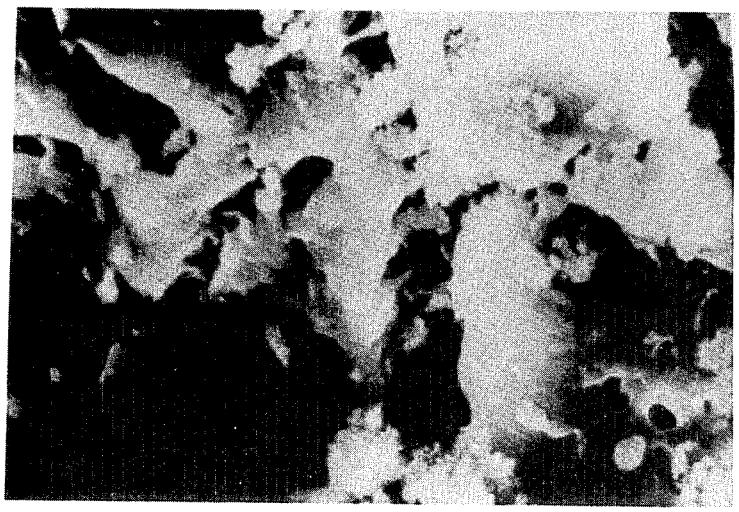
FIG. 4 shows the electron-microscopic photographs of pellets (prepared in Example 1) of 5000 magnifications. FIG. A is the cross section of pellet (after molding) before the synthesis to form the binderless zeolite. FIG. B is the surface of pellet after the synthesis to form the binderless zeolite. FIG. C is the cross section of pellet after the synthesis to form binderless zeolite.
Figure 4B:
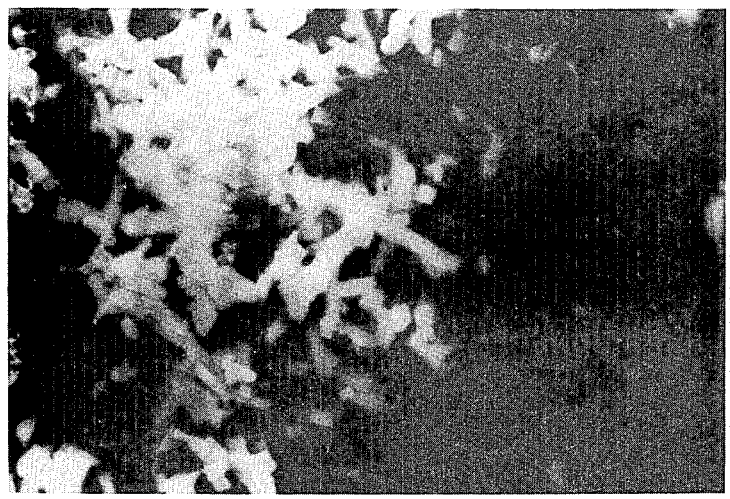
Figure 4C:
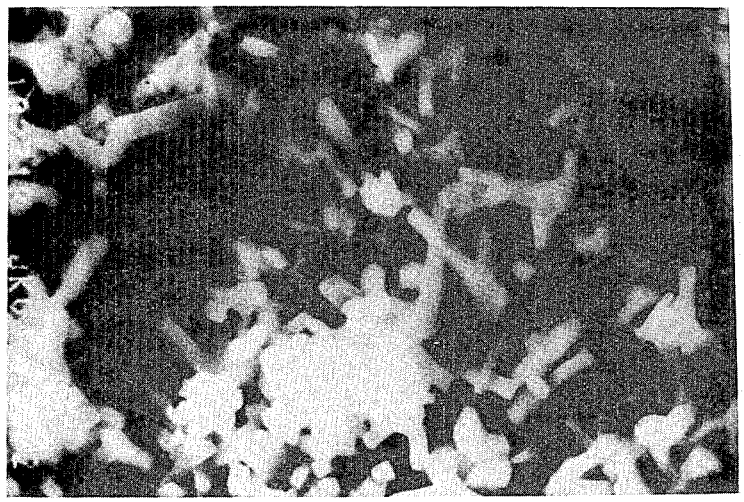

Further, the electron-microscopic photographs also showed that the pellets consisted almost entirely of crystalline substances and therefore the silica alumina wet gel had been converted into TSZ. FIG. 4 shows the electron-microscopic photographs of the surface and cross section before and after the synthesis.

Figure 6:
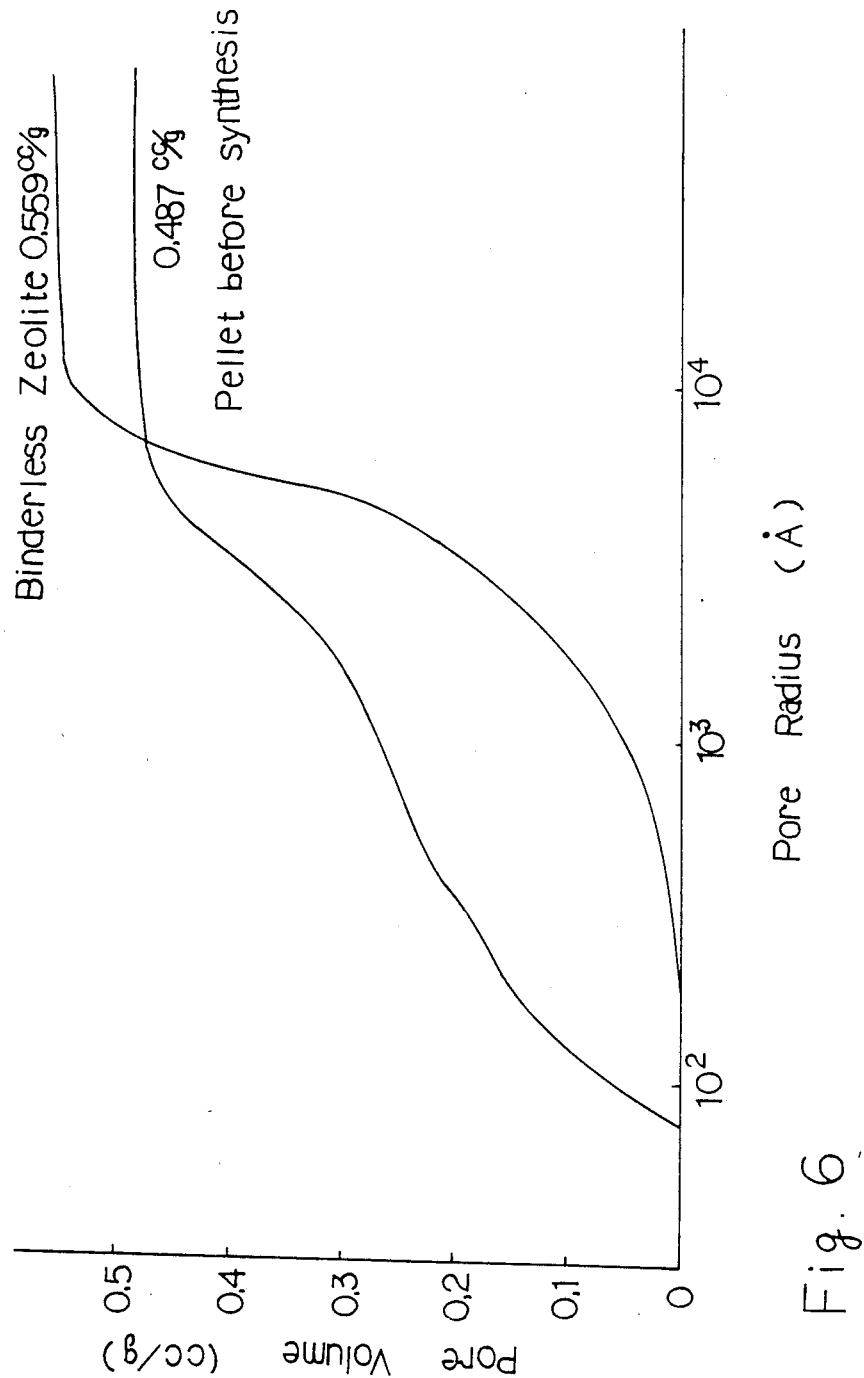
FIG. 6 shows the graphs illustrating the secondary pore radius distributions of pellets before and after the synthesis to form the binderless zeolite obtained in Example 1.

The determination of the pore radius distribution by the mercury porosimetry gave a characteristic pore radius distribution curve. FIG. 6 shows the pore radius distribution curves before and after the synthesis, and the total pore volume as measured by the mercury porosimetry after the synthesis was 0.559 cc/g, and therefore it was evident that 30% of the total pore was contained within the range of the average pore radius ±20%.

The crushing strength of the pellets after drying was 1.5 kg/3 mm, which was a strength sufficient to withstand to practical use.

EXAMPLE 2

50 g of a silica alumina xerogel and 380 g of a silica alumina wet gel (water content of 86.8% by weight) were blended together until the blend reached a moldable water content and molded into pellets (outside diameter of about 1.5 mm) through an extruder.

The silica alumina xerogel used herein was prepared in the following way. An aqueous sodium aluminate solution (17.8 g of sodium aluminate and 550 g of pure water) was added to an aqueous water glass solution (515 g of NO. 3 water glass and 255 g of pure water). The resulting solution and a hydrochloric acid solution (152.9 g of 35% hydrochloric acid and 330 g of pure water) were added to an aqueous sodium chloride solution (91 g of sodium chloride and 760 g of pure water) to form a gel. After mixing, the reaction mixture was agitated for about 30 minutes, filtered, washed and dried at 110° C. for 16 hours to obtain the silica alumina xerogel.

The preparation of the silica alumina wet gel was carried out in the same manner as in Example 1.

The pellets were dried at about 110° C. for 5 hours. Chemical analysis on a portion of these pellets revealed that it has a composition of 78.4% by weight of $SiO_2$, 3.65% by weight of $Al_2O_3$, 5.51% by weight of $Na_2O$ and 12.3% by weight of an ignition loss (900° C.).

The pellets were further calcined at 600° C. for 3 hours and a 50 g portion of the pellets together with 43.2 g of sodium chloride, 1 g of sodium hydroxide and 619 g of pure water was placed in a 1 l stainless autoclave and crystallized at 180° C. for 64 hours.

Figure 2:
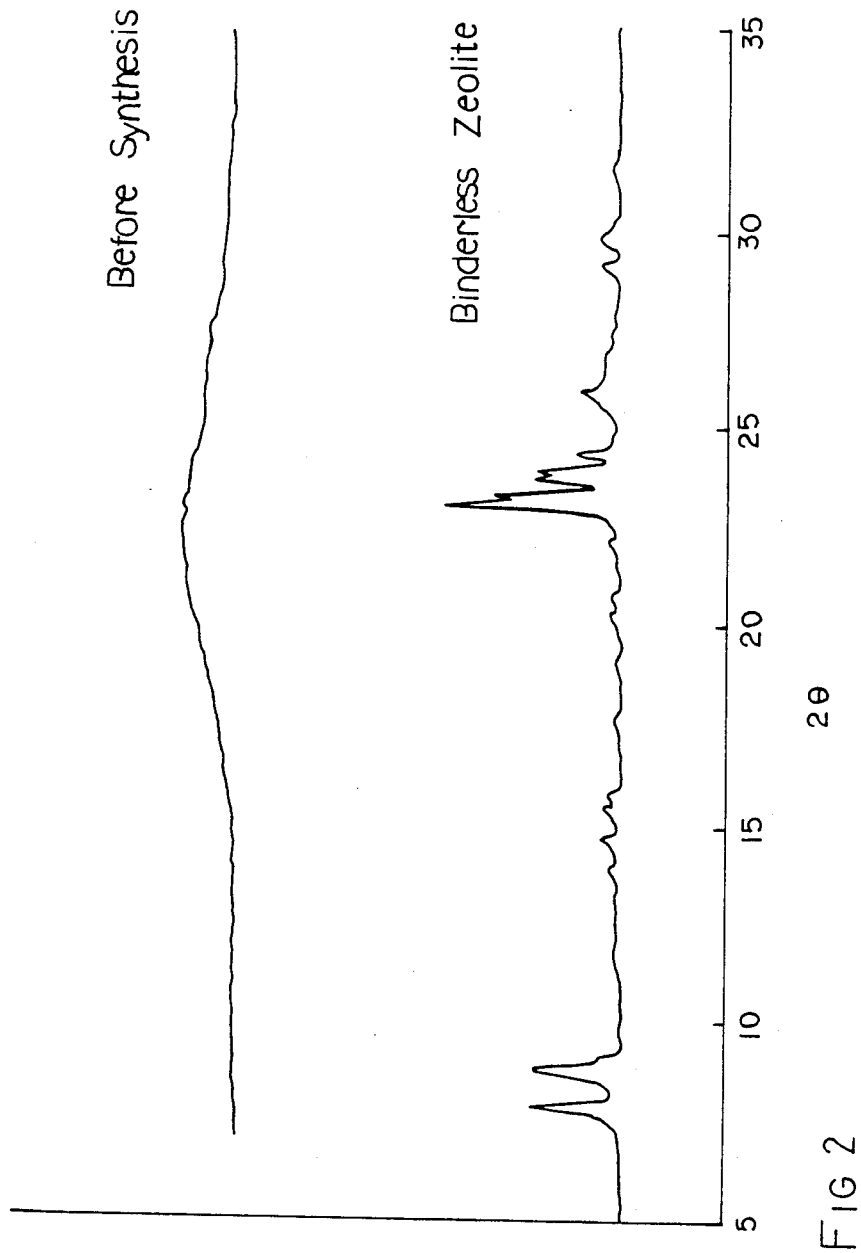
FIG. 2 shows the powder X-ray diffraction patterns of pellets before and after the synthesis to form the binderless zeolite in Example 2.
Figure 7:
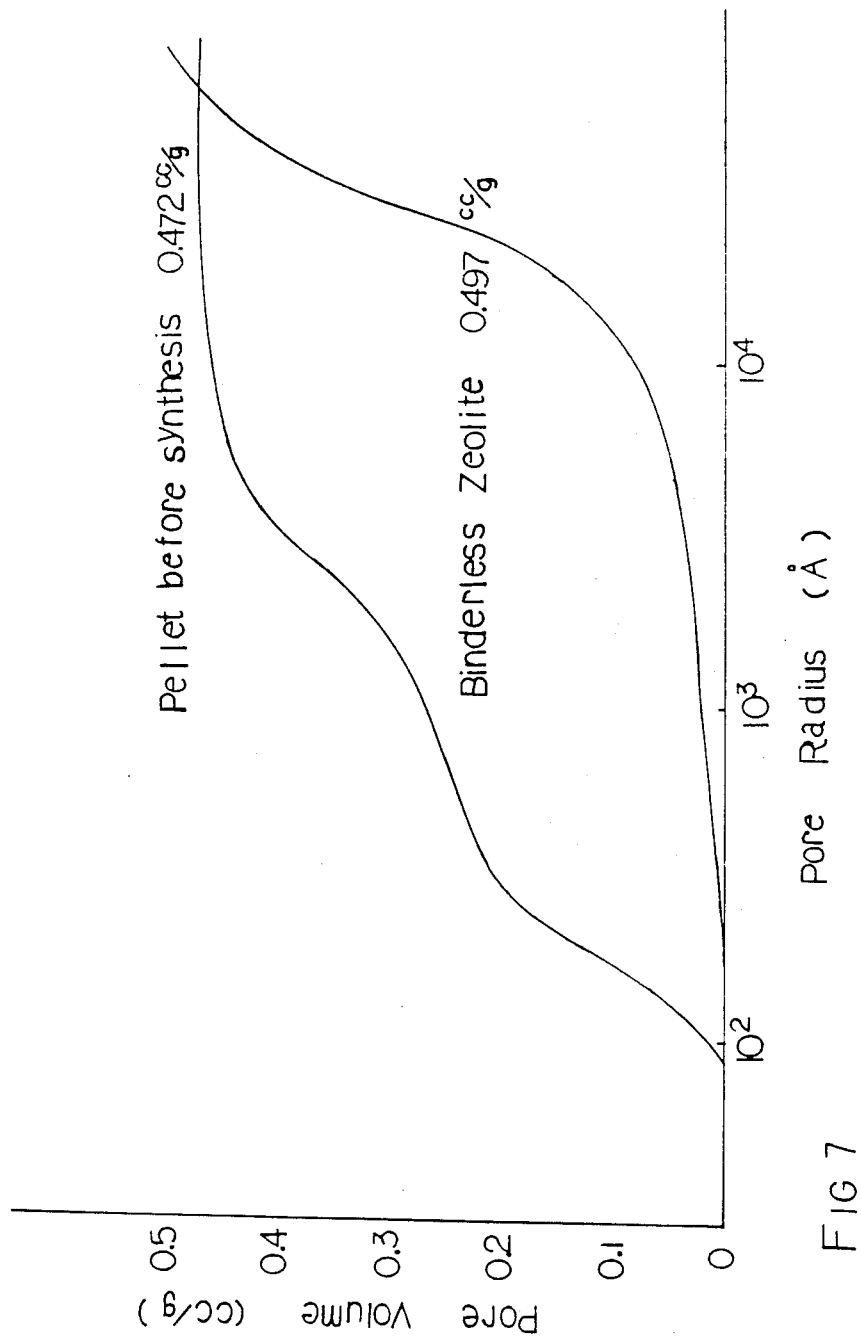
FIG. 7 shows the graphs illustrating the secondary pore radius distributions of pellets before and after the synthesis to form the binderless zeolite obtained in Example 2.

FIG. 2 shows the powder X-ray diffraction patterns, and FIG. 7 shows the pore radius distribution curves.

The pellets has a crush strength of 1.0 kg/3 mm.

The total pore volume as determined by the mercury porosimetry after the synthesis was 0.497 cc/g, and therefore it was evident that 30% of the total pore volume was contained within the range of the average pore radius ±20%.

EXAMPLE 3

70 g of a hydrothermally treated silica alumina xerogel and 532 g of a silica alumina wet get (water content of 86.8% by weight) were blended together until a moldable water content was reached, and molded into pellets (outside diameter of about 1.5 mm) through an extruder. The hydrothermally treated silica alumina xerogel herein used was prepared by adding an aqueous aluminum sulfate solution (19.7 g of aluminum sulfate, 21.1 g of 95% sulfuric acid, and 210 g of pure water) and an aqueous water glass solution (303 g of No. 3 water glass and 153 g of pure water) to an aqueous sodium chloride solution (90 g of sodium chloride and 600 g of pure water) to form a gel, agitating the mixture for about one hour, placing the mixture in a 1 l stainless autoclave, subjecting the mixture to a hydrothermal treatment at 160° C. for 20 hours under an autogenous pressure and, after filtration and washing, drying the product at 110° C. for 20 hours. A portion of these pellets was taken and subjected to a powder X-ray diffractiometric analysis. It was found to be amorphous.

The preparation of the silica alumina wet gel was carried out in the same manner as in Example 1.

The molded pellets were dried at about 110° C. for 20 hours, and calcined at 550° C. for 3 hours. Chemical analysis on a portion of these pellets revealed that it had a composition of 87.1% by weight of $SiO_2$, 4.02% by weight of $Al_2O_3$, 6.09% by weight of $Na_2O$, and 2.52% by weight of an ignition loss (900° C.).

A 50 g portion of the pellets, together with 43.2 g of sodium chloride, 1 g of sodium hydroxide and 688 g of pure water, was placed in a 1 l stainless autoclave and crystallized at 180° C. for 40 hours.

Figure 3:
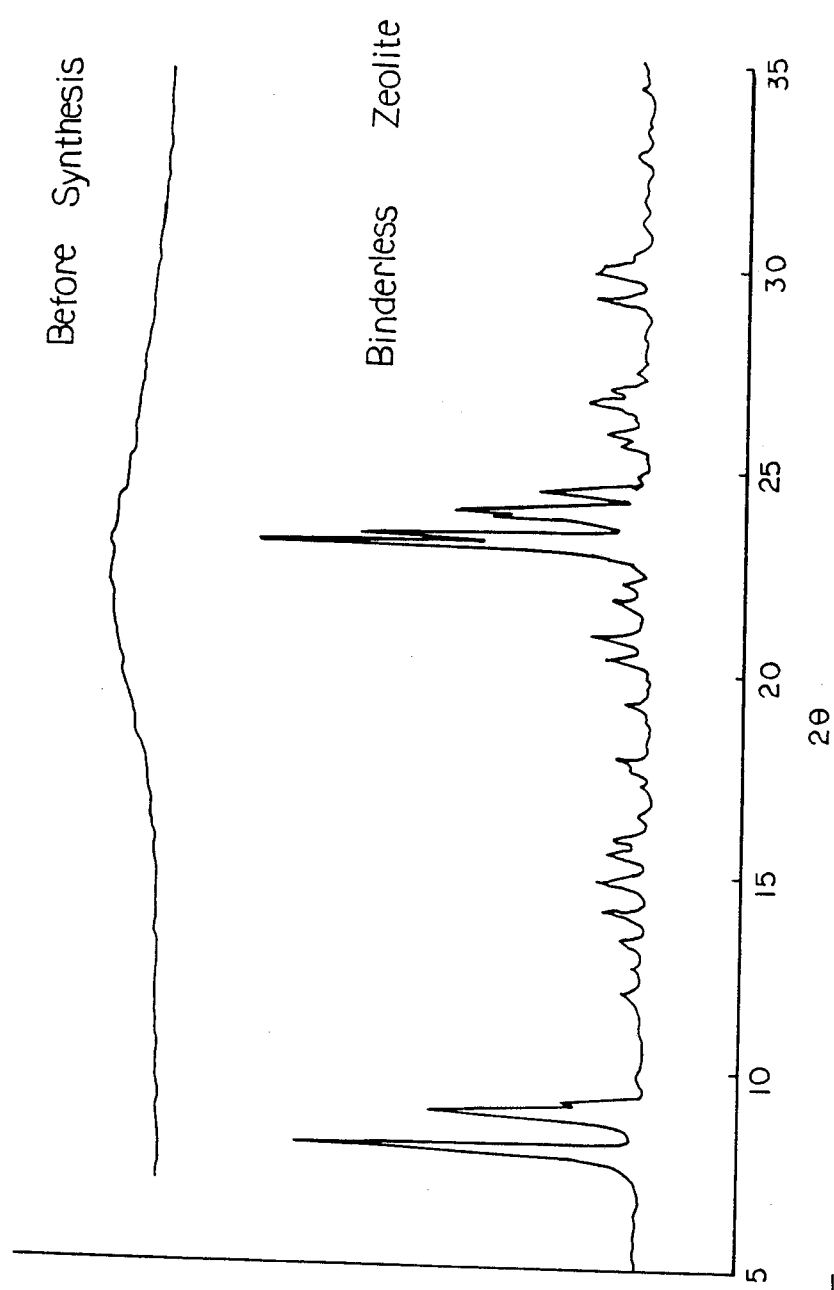
FIG. 3 shows the powder X-ray diffraction patterns of pellets before and after the synthesis to form the binderless zeolite in Example 3.
Figure 5A:
FIG. 5 shows the electron-microscopic photographs of pellets (prepared in Example 3) of 5000 magnifications. FIG. D is the cross section of pellet (after molding) before the synthesis to form the binderless zeolite. FIG. E is the surface of pellet after the synthesis to form the binderless zeolite. FIG. F is the cross section of pellet after the synthesis to form binderless zeolite.
Figure 5B:
Figure 5C:
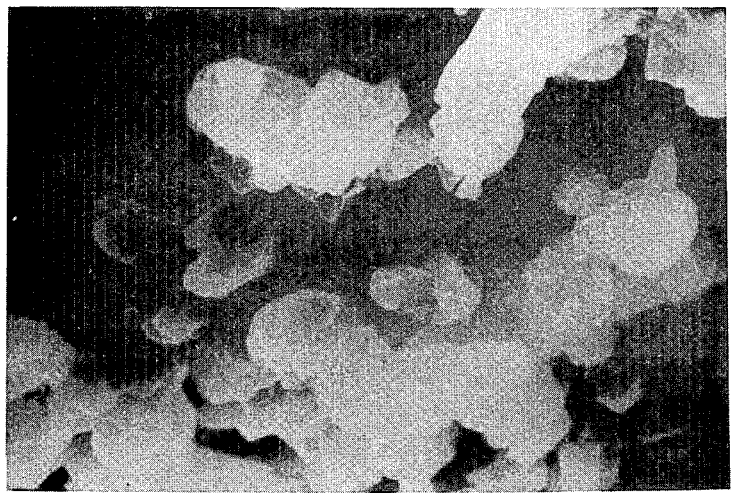
Figure 8:
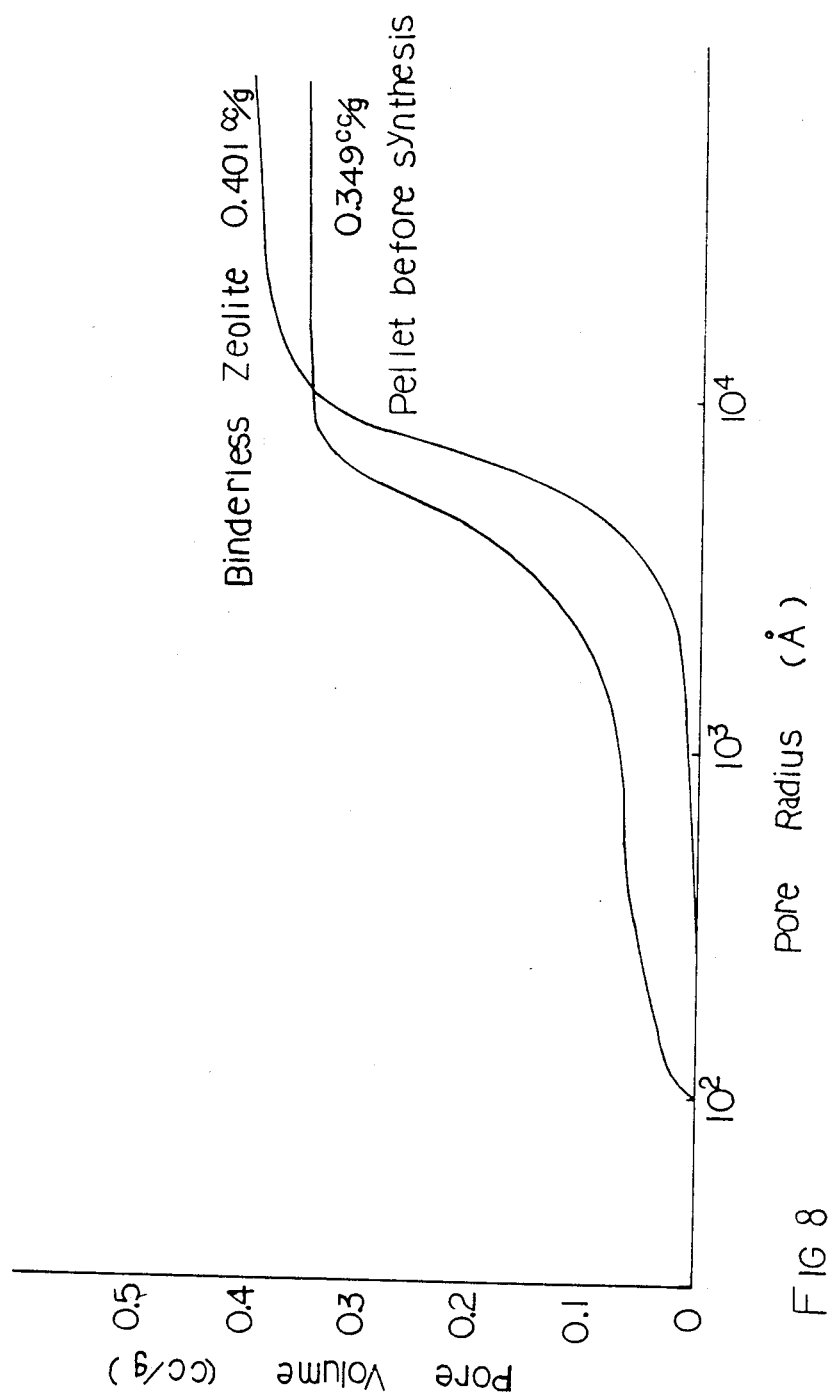
FIG. 8 shows the graphs illustrating the secondary pore radius distributions of pellets before and after the synthesis to form the binderless zeolite obtained in Example 3.

FIG. 3 shows the results of powder X-ray diffraction patterns, FIG. 5 shows the electron microscopic photographs, and FIG. 8 shows the pore radius distribution curves.

The pellets after drying had a crushing strength of 1.9 kg/3 mm.

The total pore volume as determined by the mercury porosimetry after the synthesis was 0.401 cc/g, and therefore it was evident that 39% of the total pore volume was contained within the range of the average pore radius ±20%.

EXAMPLE 4

50 g of $\alpha$-$Al_2O_3$ powder and 335 g of a silica alumina wet gel (water content of 86.6% by weight) were blended together in a kneader until a moldable water content was reached, and molded into pellets (outside diameter of about 1.5 mm) through an extruder.

The $\alpha$-$Al_2O_3$ was prepared from heat-treated gibbsite at 1250° C. for 20 hours and showed only the diffraction pattern of $\alpha$-$Al_2O_3$ when analyzed by powder X-ray diffractiometry.

The silica alumina wet gel was prepared in the same way as in Example 1.

The molded pellets were dried at about 110° C. for 20 hours and calcined at 600° C. for 3 hours. Chemical analysis on a portion of the pellets revealed that it has a composition of 38.5% by weight of $SiO_2$, 51.9% by weight of $Al_2O_3$, 3.34% by weight of $Na_2O$, and 5.85% by weight of an ignition loss (900° C.).

A 50 g portion of these pellets was taken and placed together with 48 g of sodium chloride, 19 g of sodium hydroxide and 68 g of pure water, in a 1 l stainless autoclave and crystallized at 185° C. for 46 hours.

After lowering the temperature, the pellets were withdrawn from the autoclave and after drying, subjected to a powder X-ray diffractiometric analysis to obtain the diffraction patterns of TSZ and $\alpha$-$Al_2O_3$.

Figure 9:
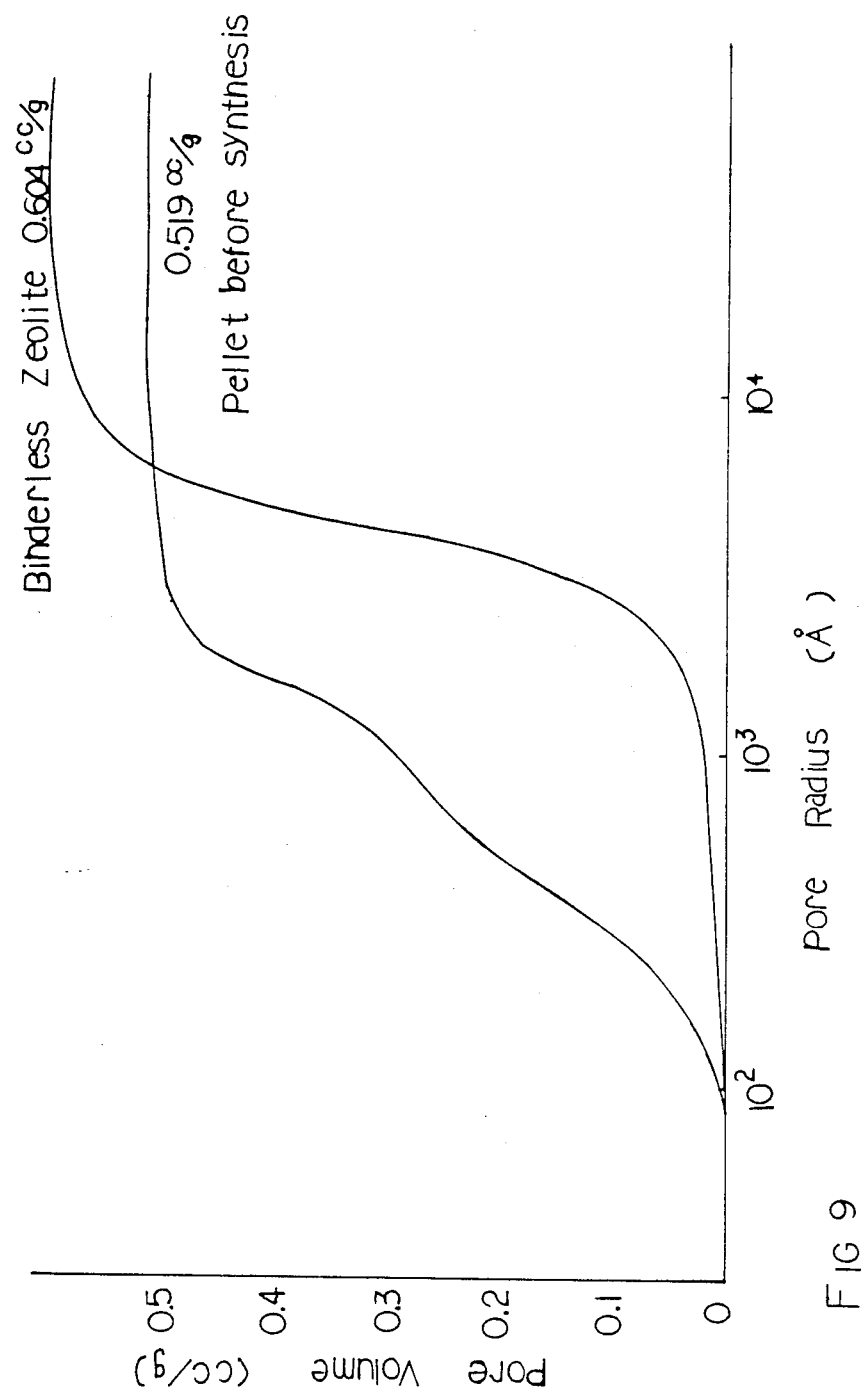
FIG. 9 shows the graphs illustrating the secondary pore radius distributions of pellets before and after the synthesis to form the binderless zeolite obtained in Example 4.

The determination of the pore radius distribution by the mercury porosimetry gave characteristic pore radius distribution curves shown in FIG. 9.

The crush strength of the pellets was 2.3 kg/3 mm.

The total pore volume as determined by the mercury porosimetry after the synthesis was 0.604 cc/g and therefore it was evident that 41% of the total pore volume was contained within the range of the average pore radius ±20%.

EXAMPLES 5 TO 8

Samples which were prepared by blending and molding in the same way as in Example 3 were calcined at 550° C. for 3 hours. Then, the influences of the addition of NaCl or NaOH were examined. The results are shown in Table 1.

TABLE 1

| Example | 5 | 6 | 7 | 8 |
|---|---|---|---|---|
| Extrudates (g) | 10.0 | 10.0 | 10.0 | 10.0 |
| NaCl (g) | — | 9.6 | — | — |
| NaOH (g) | — | — | 0.37 | 0.64 |
| $H_2O$ (g) | 137.5 | 137.5 | 137.5 | 137.5 |
| Crystallization conditions | 180° C. × 40 hrs. | 180° C. × 40 hrs. | 180° C. × 40 hrs. | 180° C. × 40 hrs. |
| Crystallinity | Amorphous | Good | mixed crystal with $\alpha$-$SiO_2$ | mixed crystal with Mordenite |
| Crushing strength (kg/3 mm) | 2.5 | 2.0 | 1.1 | 0.3 |

The powder X-ray diffraction intensities of Example 6 were same to those of Example 3.

EXAMPLES 9 TO 14

Samples prepared by blending and molding in the same way as in Example 1 were calcined at 600° C. for 3 hours. Then, the influences of sodium salt or a cation source were examined. The obtained results shown in Table 2 demonstrated that these factors were important.

TABLE 2

| Example | 9 | 10 | 11 | 12 | 13 | 14 |
|---|---|---|---|---|---|---|
| Extrudates (g) | 10.0 | 10.0 | 10.0 | 10.0 | 10.0 | 10.0 |
| NaCl (g) | — | 9.6 | — | 9.6 | — | 9.6 |
| $NaO_2SO_4$ (g) | — | — | — | — | 9.6 | — |
| NaOH (g) | — | — | 0.2 | 0.2 | 0.2 | — |
| TMAOH (g) | — | — | — | — | — | 1.8 |
| $H_2O$ (g) | 137.5 | 137.5 | 137.5 | 137.5 | 137.5 | 137.5 |
| Crystallization conditions | 185° C. × 44 hrs. | 185° C. × 44 hrs. | 185° C. × 44 hrs. | 185° C. × 44 hrs. | 185° C. × 44 hrs. | 185° C. × 44 hrs. |
| Crystallinity | Bad | Good | Moderate | Good | Good | Bad |

Note:
TMAOH refers to 30% of aqueous solution of tetramethylammonium hydroxide.

EXAMPLE 15 to 21

Samples which were prepared by carrying out blending and molding in the same way as in Example 1 were calcined at 600° C. for 3 hours. Then, the influences of the addition of NaCl were examined. The results shown in Table 3 demonstrated that the addition of NaCl was extremely important in this invention.

TABLE 3

| Example | 15 | 16 | 17 | 18 | 19 | 20 | 21 |
|---|---|---|---|---|---|---|---|
| Moldings (g) | 10.0 | 10.0 | 10.0 | 10.0 | 10.0 | 10.0 | 10.0 |
| NaCl (g) | — | 1.2 | 4.8 | 2.4 | 4.8 | 9.6 | — |
| NaOH (g) | — | — | — | 0.2 | 0.2 | 0.2 | 0.2 |
| $H_2O$ (g) | 137.5 | 137.5 | 137.5 | 137.5 | 137.5 | 137.5 | 137.5 |
| Crystallization conditions | 185° C. × 4 hrs. | 185° C. × 4 hrs. | 185° C. × 4 hrs. | 185° C. × 4 hrs. | 185° C. × 4 hrs. | 185° C. × 4 hrs. | 185° C. × 4 hrs. |
| Crystallinity | Bad | Moderate | Good | Good | Good | Good | Moderate |

EXAMPLE 22

30 g of the sodium form TSZ catalyst obtained in Example 1 was subjected to an ion exchange treatment at 80° C. four times (the treating time for each being 1.5 hours) by using a 5 wt. % ammonium chloride solution in an amount of 15 ml per 1 g of TSZ. Then, the ion-exchanged product was washed with water, dried at 100° C. and calcined in air at 550° C. for 3 hours to obtain H-TSZ (hydrogen form TSZ) catalyst. This H-TSZ contained 0.02% by weight of $Na_2O$.

This catalyst was pulverized and classified to a size of ASTM 60/80 mesh. A 0.2 g portion of the powder was placed in a glass flow reactor.

A solution prepared by mixing n hexane with 3-methylpenthane in a weight ratio of 1:1 was cooled to 10° C. and passed together with nitrogen as a carrier gas so that the weight hourly space velocity (W/H/W) could be 1.36. Table 4 shows the reaction rates at 300°, 350° and 400° C. after 0.5 hour.

Comparative Example 1

The TSZ zeolite prepared according to the method of Example 1 was converted into H (hydrogen) form TSZ in the same manner as in Example 22. This H-TSZ contained 0.02% by weight of $Na_2O$.

The wet gel used in Example 1 of the present application was thoroughly washed with a 1.5% ammonium carbonate solution. This wet gel was dried at 110° C. for 5 hours, and subjected to chemical analysis. It was found that the $Na_2O$ content was 0.05% by weight.

The binder thus obtained was mixed with the zeolite so that the weight ratio of the former to the latter could be in the range of 70:30 after calcination at 600° C. for 3 hours, and molded. The extrudate was calcined at 660° C. for 3 hours, pulverized in the same way as in Example 22, and classified to a size of ASTM 60/80 mesh. A 0.2 g portion of this powder was placed in a glass flow reactor.

The reaction was carried out in the same manner as in Example 22 of the present application, and the results shown in Tables 4 and 4' were obtained.

These results demonstrated that the binderless zeolite catalyst of this invention was particularly excellent in respect of reaction rates and yields of aromatics.

The weight hourly space velocity (W/H/W) in this case was adjusted to 0.95 (W/H/W) so as to coincide with the case of Example 22.

TABLE 4

| Rate constant | | $k$ (hr$^{-1}$) | | |
|---|---|---|---|---|
| Temperature (°C.) | | 300 | 350 | 400 |
| Example 22 | | | | |
| n-hexane | | 0.40 | 1.22 | 2.58 |
| 3-methylpentane | | 0.04 | 0.29 | 0.96 |
| Comparative Example 1 | | | | |
| n-hexane | | 0.37 | 0.78 | 1.42 |
| 3-methylpentane | | 0.05 | 0.21 | 0.68 |
| Temperature (°C.) | | 300 | 350 | 400 |
| Example 22 | | | | |
| Product | $H_2$ | 0.39 | 1.12 | 1.37 |
| composition | P | 82.1 | 63.0 | 54.8 |
| (% by weight) | | | | |
| | O | 15.8 | 25.4 | 24.6 |
| | Ar | 1.7 | 10.5 | 19.3 |
| Comparative Example 1 | | | | |
| Product | $H_2$ | 0.40 | 0.66 | 0.57 |
| composition | P | 82.4 | 71.2 | 63.3 |
| (% by weight) | | | | |
| | O | 15.0 | 22.3 | 26.1 |
| | Ar | 2.2 | 5.8 | 10.0 |

P: Paraffins,
O: Olefins,
Ar: Aromatics

EXAMPLE 23

The binderless catalyst (H-TSZ) obtained in Example 22 was pulverized and classified to a size of ASTM 25/60 mesh. A 3 g portion of this was placed in a glass flow reactor, through which a starting material comprising a 1,2,4-trimethylbenzene/methanol mixture (molar ratio of ½) as shown in Table 5 was passed at 325° C. Table 5' shows conversions of trimethylbenzene, selectivities for $C_{10}$ aromatic products and isomer distributions of $C_{10}$ aromatic products which were measured 4 hours after the start of the reaction.

Comparative Example 2

The binder and the H-TSZ which were obtained in Comparative Example 1 were pulverized together and the powder was classified to a size of ASTM 25/60 mesh. A 3 g portion of this was placed in a glass flow reactor, through which a starting material comprising a 1,2,4-trimethylbenzene/methanol mixture (molar ratio of ½) as shown in Table 5 was passed at 325° C. While the weight hourly space velocity in Example 23 was 3.2 W/H/W, that in this Example was set at 2.3 W/H/W so that both of the space velocities of the materials over the zeolite catalyst would be equal. Table 5' shows the results together with those of Example 23.

These results demonstrated that the binderless zeolite catalyst of this invention was extremely excellent in selectivities for $C_{10}$ aromatic products.

TABLE 5

| Reaction Conditions | | Example 23 | Comparative Example 2 |
|---|---|---|---|
| Catalyst obtained in | | Example 22 | Comparative Example 1 |
| Material: | | | |
| TMB/methanol (mol/mol) | | ½ | ½ |
| Temperature (°C.) | | 325 | 325 |
| Pressure | | Atmospheric | Atmospheric |
| Weight hourly space velocity (W/H/W) | | 3.2 | 2.3 |
| Conversion: TMB (%) | | 22.4 | 19.3 |
| Yield of aromatic product (mol % based on TMB) | | 100.3 | 100.1 |

| Results of reaction | | Example 23 | Comparative Example 2 |
|---|---|---|---|
| Selectivity for | $C_6$ | 0 | 0.3 |
| aromatic product | $C_7$ | 0.2 | 1.6 |
| (molar %) | $C_8$ | 6.8 | 13.7 |
| | $C_9$ | 6.4 | 10.9 |
| | $C_{10}$ | 84.4 | 73.4 |
| | $C_{11}{}^+$ | 2.2 | 0.1 |
| Isomer | 1, 2, 4, 5-TeMB | 88.6 | 88.6 |
| distribution of | 1, 2, 3, 5-TeMB | 4.6 | 5.3 |
| $C_{11}$ aromatic | 1, 2, 3, 4-TeMB | 5.6 | 3.9 |
| products | Others | 1.2 | 2.2 |

Note:
TMB refers to 1, 2, 4-trimethylbenzene
TeMB refers to tetramethylbenzene

EXAMPLE 24

The binderless catalyst (H-TSZ) obtained in Example 22 was pulverized and classified to a size of ASTM 25/60 mesh. A 1 g portion of this H-TSZ was placed in a glass flow reactor. A toluene/ethylene/hydrogen mixture (molar ratio of 5/1/5) was passed over the catalyst at atmospheric pressure and a weight hourly space velocity of toluene of 6.5 W/H/W. The liquid product recovered during a period from 4.5 to 5.0 hours after the start of the reaction was analyzed gas-chromatographically to determine the conversion of toluene, and the isomer distribution of ethyltoluene products. Table 6 shows the results.

Comparative Example 3

The H-TSZ obtained in Comparative Example 1 was blended with an alumina binder ($Na_2O$ content of 0.005% by weight) prepared from aluminum sulfate and sodium aluminate used in amounts to provide a weight ratio of the former to the latter of 70/30 after calcination at 600° C. for 3 hours, and then molded. After drying at 110° C., the extrudate was calcined at 600° C. for 3 hours to form a binder containing catalyst. This was classified into a size of ASTM 25/60 mesh and used in the reaction similar to that in Example 24. In this case, the weight hourly space velocity of toluene over the zeolite was adjusted to 4.6 W/H/W so as to coincide with the case of Example 24.

The sample recovered 4.5 to 5.0 hours after the start of the reaction was analyzed to obtain the results shown in Table 6.

TABLE 6

| | Example 24 | Comparative Example 3 |
|---|---|---|
| Raw Material: | | |
| toluene/ethylene/hydrogen (molar ratio) | 5/1/5 | 5/1/5 |
| Temperature (°C.) | 350 | 350 |
| Conversion of toluene (% by weight) | 19.22 | 18.76 |
| Isomer distribution of ethyltoluene (%) | | |
| p | 30.19 | 28.18 |
| m | 61.23 | 63.49 |
| o | 8.58 | 8.33 |

These results demonstrated that the binderless zeolite of this invention was excellent in conversion of toluene and selectivity for p-ethyltoluene formation as compared with the conventional catalyst.

POSSIBILITY TO INDUSTRIAL USES

As is different from powder forms the binderless zeolite catalyst obtained in this invention can be extremely easily handled in the subsequent operations such as washing, conversion into hydrogen form and ion exchange of active metal species. The binderless zeolite of this invention thus obtained is not only excellent in activity because of controlled secondary pores but also excellent in an ability to retain its activity, and exhibits an excellent performance as a catalyst for the selective cracking of n-paraffimic hydrocarbons or the alkylation of aromatics with alkylating agents such as alcohols or olefins.

What is claimed is:

1. A process for producing a binderless zeolite catalyst which is a molded body consisting essentially of TSZ crystalline aluminosilicate, by carrying out a hydrothermal treatment of a solid prepared by molding a mixture obtained by mixing 30 to 70 weight % of at least one member selected from the group consisting of a silica/alumina xerogel, a hydrothermally treated silica/alumina xerogel and mixtures thereof with 70 to 30 weight % of a silica/alumina gel having an $SiO_2/Al_2O_3$ ratio essentially equal to that of TSZ crystalline aluminosilicate, wherein said hydrothermal treatment is carried out in an aqueous solution in the presence of a neutral sodium salt mineralizer in a concentration ranging from 1.5 weight % to the solubility limit until the aluminosilicate content reaches essentially 100%.

2. A process of claim 1 wherein said hydrothermal treatment is carried out in the absence of organic cation.

3. A process of claim 1 wherein said molding is carried out to produce pellets, polylobal bodies, or hollow tubes.

* * * * *